United States Patent [19]

Swinderman et al.

[11] Patent Number: 5,088,965

[45] Date of Patent: Feb. 18, 1992

[54] RADIAL TENSIONER

[75] Inventors: R. Todd Swinderman, Kewanee, Ill.; Reinhard Brandl, Nieder-OLM, Fed. Rep. of Germany

[73] Assignee: Martin Engineering Company, Neponset, Ill.

[21] Appl. No.: 690,544

[22] Filed: Apr. 23, 1991

[51] Int. Cl.$^5$ .................................................. F16H 7/08
[52] U.S. Cl. ........................................ 474/101; 474/117
[58] Field of Search ............... 474/101, 109, 113, 117, 474/133, 135, 136, 138; 198/499

[56] References Cited

U.S. PATENT DOCUMENTS

| | | | |
|---|---|---|---|
| 3,674,131 | 7/1972 | Matson | 198/230 |
| 4,171,920 | 10/1979 | Kramer | 403/223 |
| 4,533,035 | 8/1985 | Reiter | 198/499 |
| 4,533,036 | 8/1985 | Gordon | 198/499 |
| 4,925,434 | 5/1990 | Swinderman et al. | 474/101 |
| 4,934,987 | 6/1990 | Kadota et al. | 474/135 X |
| 4,934,988 | 6/1990 | Kawamura et al. | 474/117 |
| 4,995,851 | 2/1991 | Taylor et al. | 474/101 |
| 5,015,217 | 5/1991 | Henderson | 474/117 X |

Primary Examiner—Thuy M. Bui
Attorney, Agent, or Firm—Lee, Mann, Smith, McWilliams & Sweeney

[57] ABSTRACT

A tensioning device is provided for selecting and imparting torsional bias to a shaft and simultaneously providing a shock absorbing mechanism. The device includes a resilient elastomeric biasing member in the form of a web extending radially between the shaft and an actuator member. The first end of the biasing member is connected to the shaft for conjoint rotation therewith and the second end of the biasing member is connected to the actuator member. A locking mechanism selectively connects the actuator member to a fixed frame after a torsional biasing force is imparted to the shaft.

11 Claims, 3 Drawing Sheets

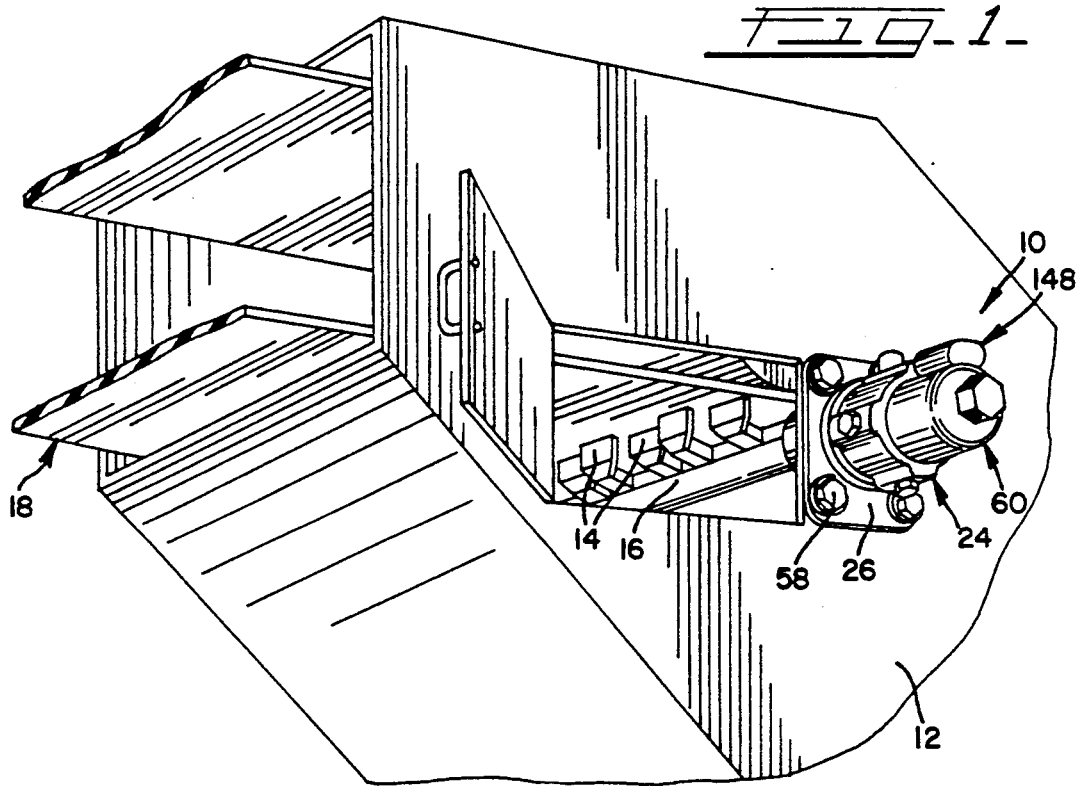
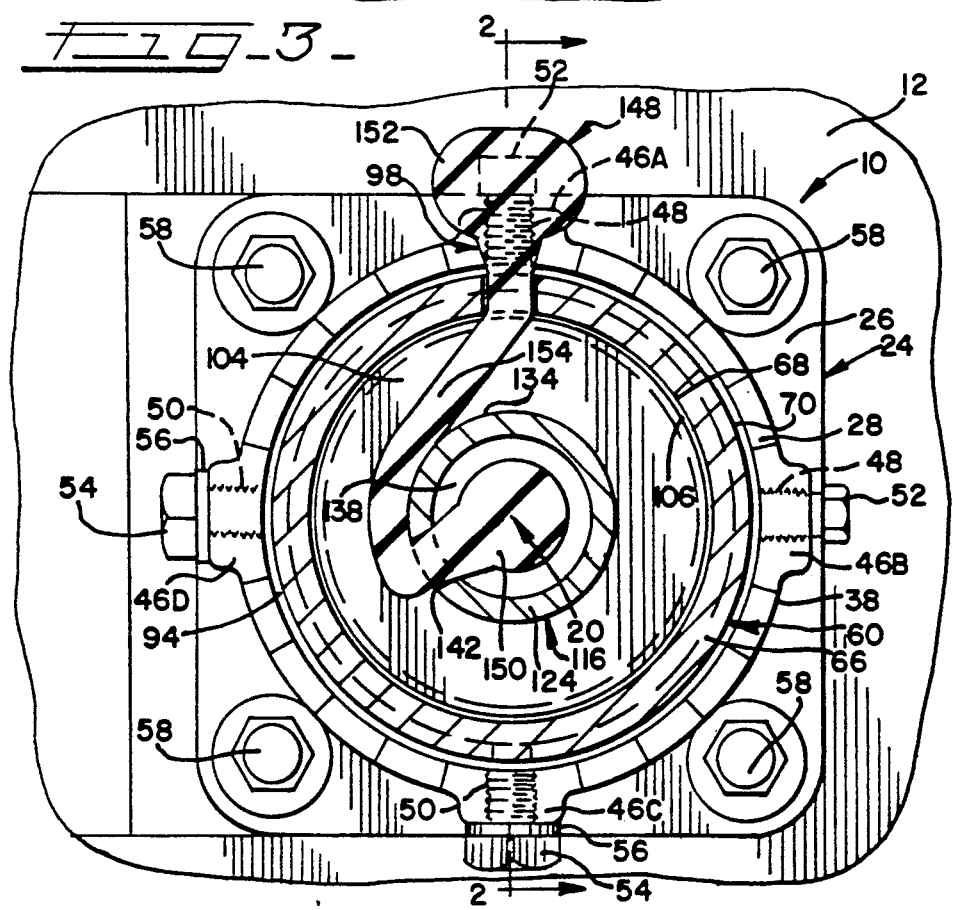

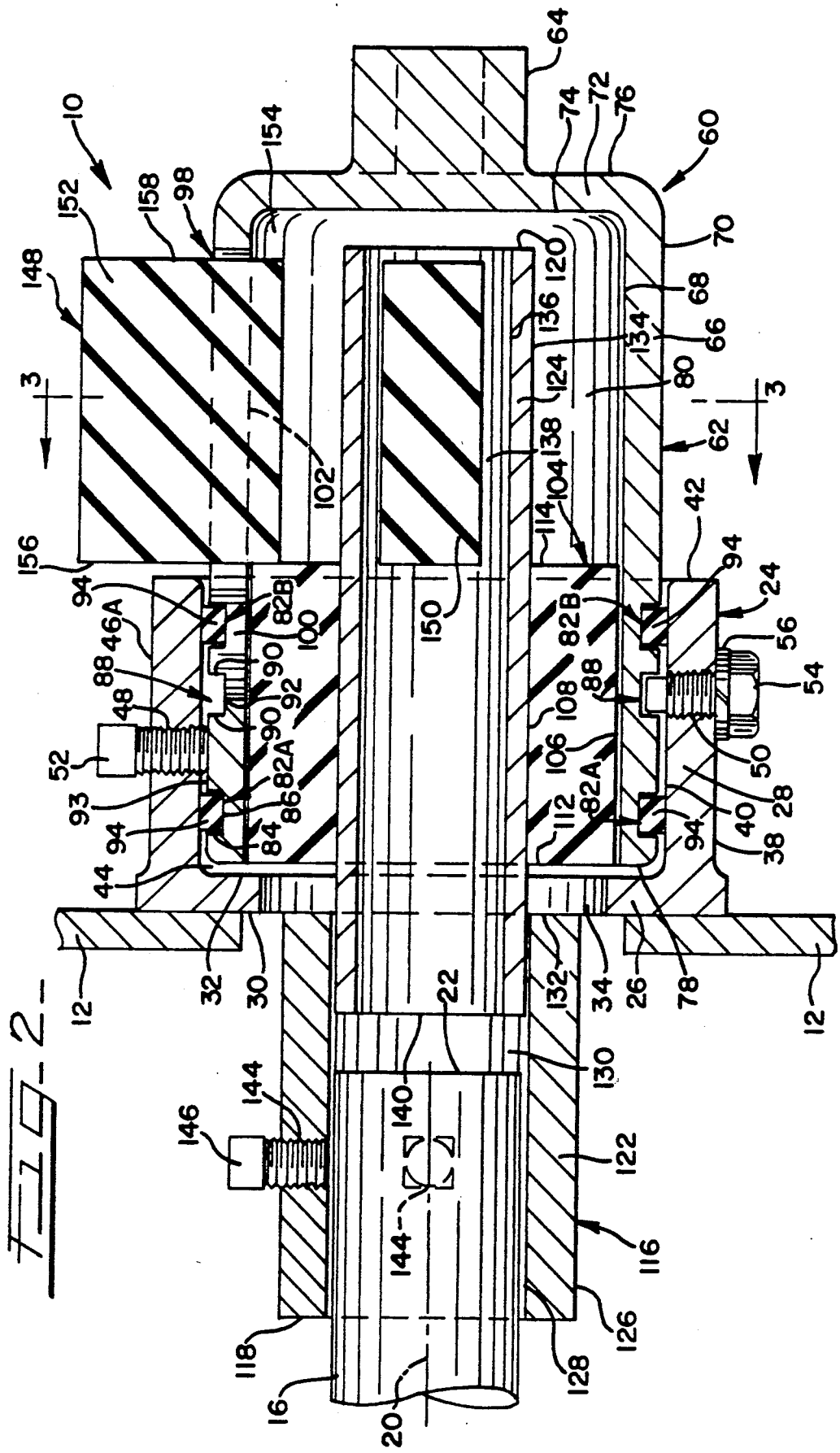

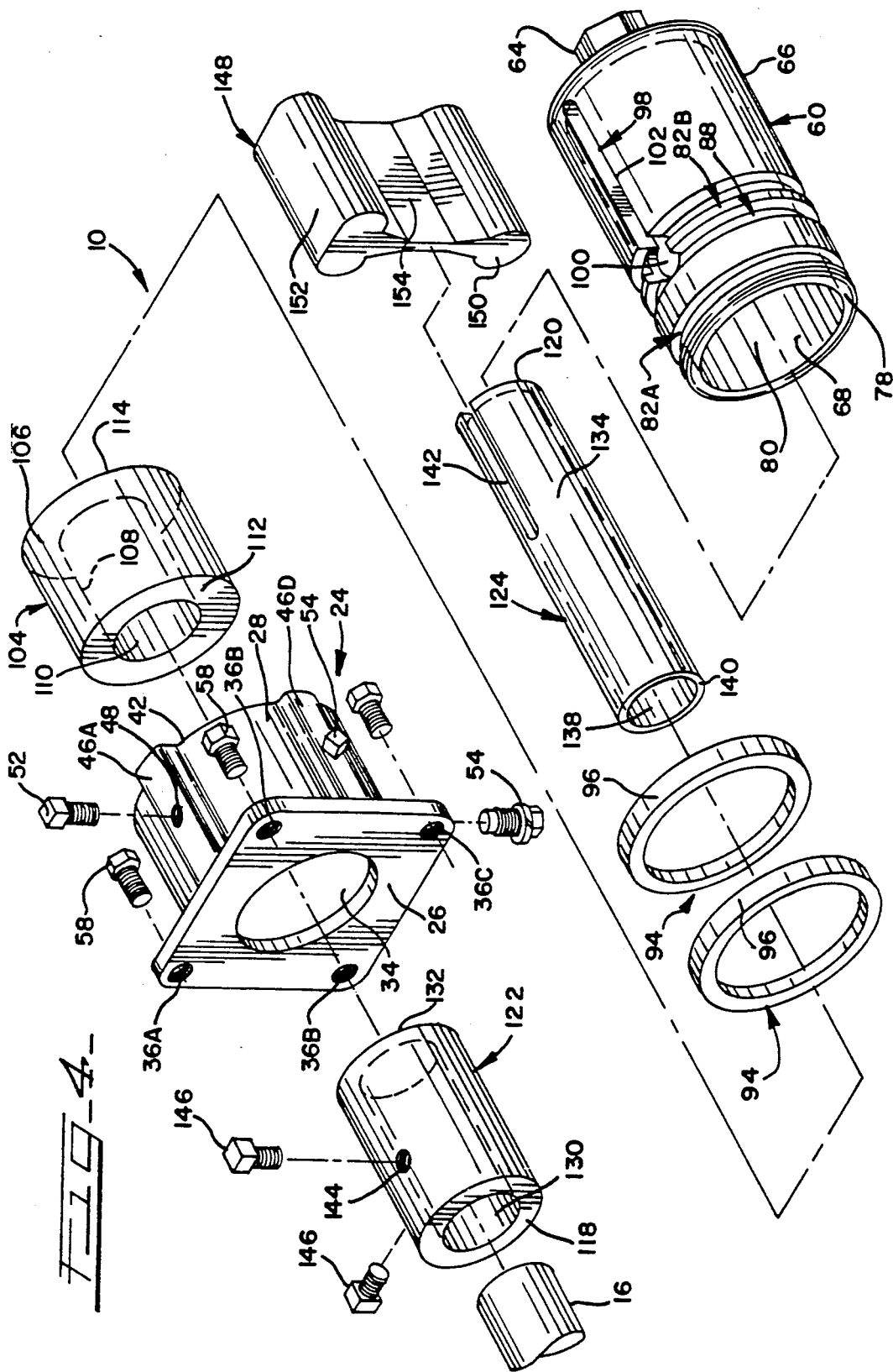

RADIAL TENSIONER

BACKGROUND OF THE INVENTION

The present invention relates to a tensioning device which is used to select and impart a moment of torque to a shaft. The present tensioning device has been found to be particularly useful in connection with conveyor belt cleaners which utilize scraper blades to clean a conveyor belt. Conveyor belt scraper blades are conventionally mounted on a shaft which is positioned transverse to the direction of conveyor belt travel. When the shaft is rotated, the blades are forced into contact with the belt to scrape off adherent material. Over time the scraper blades wear and lose contact with the belt thereby hampering the blades cleaning ability. The shaft on which the scraper blades are mounted must then be rotated to reposition the scraper blades against the belt with the desired amount of force.

Conveyor belt scraper blades are subjected to repeated impact forces which are generated by the blades coming into contact with conveyor belt splices, with enlarged pieces of the conveyed material, or other debris which adheres to the belt, all of which can cause appreciable damage to the scraper blades or the conveyor belt cleaning mechanism. To promote effective cleaning of the conveyor belt and to avoid shutting the belt down for repair, it is of the utmost importance to provide the scraper blades with a shock absorbing capability.

Previous torsional tensioning devices of the types shown in U.S. Pat. No. 4,533,036 and 4,925,434 and in U.S. patent application Ser. No. 561,969, filed Aug. 2, 1990 entitled "Spring Steel Tensioner" have been used in connection with conveyor belt scraper blades. In these devices the biasing means extends in a generally linear direction which is substantially parallel and concentric to the central axis of the conveyor belt cleaner shaft. In each of these devices the biasing means is torsionally rotated such that one end of the biasing means is rotated about the longitudinal axis of the biasing means with respect to the other end of the biasing means. In other words, the biasing means is twisted about its central longitudinal axis. A torsional force is thereby created and stored within the biasing means which provides the torsional biasing force to rotate the cleaner shaft. In each of these devices the torsional force which is applied to the tensioner by the user equals the torsional force generated in the biasing means and in the shaft. The torsional force in the biasing means can not be varied without affecting the torsional force applied to the shaft. Torsional springs used for mounting a conveyor belt cleaner to a shaft are shown in U.S. Pat. Nos. 3,674,131 and 4,533,035. A torsion spring is also shown in U.S. Pat. No. 4,171,920.

SUMMARY OF THE INVENTION

The present invention provides a tensioning device which is particularly useful in biasing conveyor belt scraper blades, which are mounted on a rotatable shaft, into contact with a conveyor belt. The tensioning device includes a biasing member consisting of a resilient elastomeric web having a first end, a second end and a center section extending radially between the first end and the second end. The first end of the biasing member is connected to the shaft and the second end of the biasing member is connected to an actuator member which is selectively rotatable within a base which is attached to a fixed frame such as a conveyor chute. The biasing member extends radially outwardly from the shaft to the actuator member such that appropriate rotation of the actuator member will create a biasing force in the biasing member.

The actuator member is selectively connectable to and relatively repositionable with respect to the fixed frame. As the actuator member is repositioned, a biasing force will be created and stored within the biasing means much the same as winding the spring of a watch stores a force. The biasing means applies a torsional biasing moment to the shaft for rotation thereof. The magnitude of the biasing force within the biasing means may be adjusted while maintaining the same torsional biasing moment which is applied to the shaft. The magnitude of the torsional biasing moment which the biasing member is able to provide for the rotation of the shaft can be adjusted by changing the cross sectional dimensions of the biasing member, by using various different materials for the biasing member, or by repositioning the actuator member relative to the fixed frame. An infinite range of torques may be selected and applied to the shaft by repositioning the actuator member with respect to the mounting frame at various distances as desired. The biasing member provides a shock absorbing mechanism for the scraper blades such that shocks which normally would be transferred from the shaft to the mounting frame will instead be absorbed, at least in part, by the biasing member.

DESCRIPTION OF THE DRAWINGS

FIG. 1 is a perspective view of the radial tensioning device shown installed in a conveyor chute.

FIG. 2 is a cross sectional view of the radial tensioning device.

FIG. 3 is a cross sectional view of the radial tensioning device taken along lines 3—3 of FIG. 2.

FIG. 4 is an exploded perspective view of the radial tensioning device.

DESCRIPTION OF THE PREFERRED EMBODIMENTS

FIG. 1 illustrates a radial tensioning device generally designated with the numeral 10 fastened to a conveyor chute 12. A plurality of scraper blades 14 are removably secured to a shaft 16 which extends transversely to the direction of travel of a conveyor belt 18 as illustrated and described in U.S. Pat. No. 4,643,293 owned by Martin Engineering Company. The scraper blades 14 may be moved into or out of scraping engagement with the conveyor belt 18 by the appropriate rotation of the shaft 16 about its longitudinal axis 20. The shaft 16 extends between a first end 22 best illustrated in FIG. 2 and a second end not shown. The tensioner 10 is shown in FIG. 1 in use with a secondary cleaner, however, the tensioner 10 may also be used with primary cleaners and other types of devices which require tensioning.

The radial tensioner 10 includes a base 24 having a mounting plate 26 and a sleeve 28. The mounting plate 26 includes an outer surface 30 located adjacent to the chute 12 and an inner surface 32. The mounting plate 26 includes a central aperture 34 and four apertures 36 A-D. The sleeve 28 is generally circular in cross-section and includes a generally circular outer wall 38 and a circular inner wall 40. The sleeve 28 extends from the mounting plate 26 and terminates in a rim 42. A hollow chamber 44 is formed within the base 24 by the inner wall 40 of the sleeve 28 and the inner surface 32 of the mounting plate 26. The sleeve 28 also includes four ribs 46A-D best seen in FIG. 4 which extend from the outer wall 38 such that the sleeve 28 is thicker at each rib 46. A threaded aperture 48 extends through each rib 46A and 46B. A threaded aperture 50 extends through each rib 46C and 46D of the sleeve 28. The threaded apertures 48 are located in the sleeve 28 in a position which is closer to the mounting plate 26 than are the threaded apertures 50. A set screw 52 is threadably inserted into each aperture 48. A stop bolt 54 is inserted through a washer 56 and into each respective aperture 50. The base 24 is rigidly mounted to the chute wall 12 by fasteners 58 which extend through the apertures 36A-D of the mounting plate 26.

The tensioner 10 also includes an actuator member 60 which includes a hub 62 and a hexagonal end 64. The hub 62 includes a sidewall 66 having a cylindrical inner surface 68 and a generally cylindrical outer surface 70. The hub 62 also includes a backwall 72 having an interior surface 74 and an outer surface 76. The sidewall 66 extends from the backwall 72 and terminates in a rim 78. The sidewall 66 and the backwall 72 form a hollow chamber 80 within the actuator member 60. The hexagonal end 64 extends outwardly from the outer surface 76 of the backwall 72. Two grooves 82A and 82B are formed in the outer surface 70 of the sidewall 66. Each groove 82A-B extends around the circumference of the sidewall 66. Each groove 82A-B is formed by a pair of sidewalls 84 and a bottom wall 86. A groove 88 is also formed in the outer surface 70 of the sidewall 66. The groove 88 is located between the grooves 82A and 82B and also extends around the circumference of the sidewall 66. The groove 88 is formed by a pair of sidewalls 90 and a bottom wall 92. The grooves 88 and 82A form a rib 93 therebetween in the sidewall 66 of the actuator member 60. A bearing 94 is located within each groove 82A and 82B. Each bearing 94 includes an anti-friction surface 96 which extends a distance outwardly from the outer surface 70 of the sidewall 66. The bearings 94 are preferably strips of an anti-friction material such as ultra-high molecular weight polyethylene. Other anti-friction bearing means may be used as desired. The actuator member 60 also includes a slot 98 which extends through the sidewall 66 of the hub 62. The slot 98 is formed by a circular aperture 100 and an adjoining generally rectangular aperture 102. The circular aperture 100 extends through the groove 82B and through a portion of the groove 88.

The actuator member 60 is located within the base 24 such that the rim 78 of the sidewall 66 is in close proximity to the inner surface 32 of the mounting plate 26 and such that the anti-friction surfaces 96 of the bearings 94 are in contact with the inner wall 40 of the sleeve 28. The groove 82A and its bearing 94 are located near the rim 78 of the hub 62 while the groove 82B and its bearing 94 are located near the rim 42 of the base 24. The groove 88 is located on the sidewall 66 of the hub 62 such that it aligns with the threaded apertures 50 and the stop bolts 54. The rib 93 on the hub 62 is located such that it is aligned with the threaded apertures 48 and the set screws 52. The sidewall 66 of the hub 62 may have various different diameters as desired. The actuator member 60 is rotatable within the base 24 and is selectively connectable to the base 24 with the set screws 52 such that the actuator member 60 may be selectively rigidly connected to the base 24 and to the chute 12.

The actuator member 60 may also include a bushing 104 having a circular outer wall 106 and a circular inner wall 108 defining a bore 110. The bore 110 extends from a first end 112 of the bushing 104 through a second end 114. The first end 112 of the bushing 104 is located at the rim 78 of the hub 62 and the second end 114 is located at the location where the rectangular aperture 102 joins the circular aperture 100 in the hub 62. The outer wall 106 of the bushing 104 is of a sufficient diameter to fit closely within the inner surface 68 of the hub 62. The bushing 104 may be made of various different materials, however, 60 Shore A rubber is preferred. Although it is preferred to include the bushing 104 in the tensioner 10, especially when the tensioner 10 is used with a primary cleaner, the bushing 104 may be eliminated if desired.

As best shown in FIG. 2, the radial tensioner 10 may include an adapter 116. The adapter 116 extends between a first end 118 and a second end 120. The adapter 116 includes a first sleeve 122 and a second sleeve 124. The first sleeve 122 includes a circular outer wall 126 and a circular inner wall 128 which defines a bore 130 extending through the first sleeve 122. The first sleeve 122 extends from the first end 118 of the adapter 116 to a second end 132. The second sleeve 124 includes a circular outer wall 134 and a circular inner wall 136 which defines a bore 138 which extends through the second sleeve 124. The second sleeve 124 extends from the second end 120 of the adapter 116 to a first end 140 which is located within the bore 130 of the first sleeve 122. The first sleeve 122 is rigidly connected to the second sleeve 124 by welding or other means. The first sleeve 122 and the second sleeve 124 may also be made from a single piece of material. The adapter 116 includes a slot 142 best shown in FIG. 4 which extends through the outer wall 134 and the inner wall 136 of the second sleeve 124. The slot 142 also extends through the second end 120 of the adapter 116. The adapter 116 also includes two threaded apertures 144 which extend through the first sleeve 122. A set screw 146 is threadably inserted into each threaded aperture 144. The diameter of the outer wall 134 of the second sleeve 124 may be varied as desired. As can be seen in FIG. 2, the diameter of the central aperture 34 in the mounting plate 26 is slightly larger than the diameter of the outer wall 126 of the adapter 116. The bore 110 in the bushing 104 is sized to fit securely around the outer wall 134 of the second sleeve 124.

The radial tensioner 10 also includes a biasing member 148 best illustrated in FIG. 4. The biasing member 148 consists of a resilient elastomeric web which includes a first end 150, a second end 152 and a center section 154 which extends between the first end 150 and the second end 152. The biasing member 148 also extends between a first side 156 and a second side 158. The first end 150 of the biasing member 148 is generally circular in cross-section while the second end 152 is generally elliptical in cross-section. The biasing member 148 is preferably formed of 50 to 60 Shore A ozone resistant natural rubber and is preferably formed of 55 Shore A natural rubber. The center section 154 of the biasing member 148 extends through the rectangular aperture 102 of the slot 98 in the actuator member 60 and through the slot 142 in the adapter 116. Each of the ends 150 and 152 of the biasing member 148 are enlarged relative to the thickness of the center section 154 so that they will not be able to pass through the rectangular aperture 102 of the slot 98 or the slot 142 in the adapter 116. As can be seen in FIG. 3, the biasing member 148 extends radially between the adapter 116, which is connected to the shaft 16, and the actuator member 60.

In this application "radially" is to be given the broadest possible interpretation and is meant to include not only a member which extends outwardly in a linear direction but also members which extend in a curvilinear fashion, spirally, or any other form of radial extension wherein the first end 150 of the biasing member 148 is located at a first distance from the longitudinal axis 20 of the shaft 16 and the second end 158 of the biasing member 148 is located at a greater distance from the longitudinal axis 20 of the shaft 16. The biasing member 148 is preferably made of rubber however other materials may be used as desired. It is also envisioned that the biasing member 148 may take the form of various types of springs which may be made of metal or other materials. More than one biasing member 148 may also be used with the radial tensioner 10 if desired. While the connection between the biasing member 148 and the actuator member 60 and the adapter 116 has been shown as utilizing slots, various other means for connecting the biasing member 148 to the actuator member 60 and the adapter 116 may also be used as desired.

While the radial tensioner 10 has been described herein utilizing an adapter 116 to connect the biasing member 148 to the shaft 16, the adapter 116 may be eliminated if desired and where conditions allow. When the shaft 16 is of sufficient length and is a hollow tube, the slot 142 may be formed directly in the shaft 16 such that the biasing member 148 may be attached directly to the shaft 16. When the shaft 16 is solid, other means of connecting the biasing member 148 directly to the shaft 16 may be used. The adapter 116 is useful however where the shaft 16 is not of a sufficient length to extend sufficiently into the chamber 80 of the hub 62.

In operation, the adapter 116 is initially inserted over the first end 22 of the shaft 16 such that the shaft 16 extends past the apertures 144 in the adapter 116. The set screws 146 are then turned to secure the shaft 16 to the adapter 116. The base 24 is then placed around the adapter 116 such that the adapter 116 extends through the aperture 34 in the base 24. The fasteners 58 are then inserted through the apertures 36A-D in the mounting plate 26 to removably secure the tensioner 10 to the chute 12. The bushing 104 is then placed around the second sleeve 124 of the adapter 116. The first end 150 of the biasing member 148 is inserted into the chamber 80 of the actuator member 60 through the circular aperture 100 of the slot 98. The actuator member 60 is then slipped over the second end 120 of the adapter 116 and over the bushing 104 while inserting the biasing member 148 into the slot 142 in the adapter 116. The biasing member 148 is positioned such that the center section 154 of the biasing member 148 extends through the slot 142, with the first end 150 being located within the bore 138 of the adapter 116, and such that the center section 154 extends through the rectangular aperture 102 of the slot 98, with the second end 152 of the biasing member 148 being located outside of the hub 62. The actuator member 60 is slipped over the end 120 of the adapter 116 until the groove 88 is aligned with the stop bolts 54 whereupon the bolts 54 are tightened such that the stop bolts 54 extend into the grooves 88. The stop bolts 54 thereby prevent movement of the actuator member 60 in a direction parallel to the axis 20 while allowing the actuator member 60 to rotate about the axis 20. The actuator member 60 is rotatable within the base 24 and is thereby selectively repositionable with respect to the base 24 and the chute 12. Rotation of the actuator member 60 within the base 24 is facilitated by the bearings 94 which are in contact with the inner surface 40 of the base 24. The actuator member 60 is selectively connectable to the base 24 and the chute 12 by the tightening of the set screws 52 down upon the rib 93 of the actuator member 60.

In order to bias the scraper blades 14 into engagement with the conveyor belt 18, the set screws 52 are loosened. A common wrench or socket wrench may be used to rotate the hexagonal end 64 of the actuator member 60 which in turn rotates the second end 152 of the biasing member 148. As the actuator member 60 continues to be rotated, the biasing member 148 will begin to wrap around the outer wall 134 of the adapter 116 until the first end 150 of the biasing member 148 engages the inner wall 136 of the adapter 116. Further rotation of the actuator member 60 will then rotate the adapter 116 and the shaft 16 until the scraper blades 14 come into contact with the conveyor belt 18. Rotation of the actuator member 60 may then be continued to produce the desired moment of torque which will urge the scraping blades 14 against the conveyor belt 18 with the desired amount of force. As the actuator member 60 is rotated with no corresponding rotation of the adapter 116 or the shaft 16, the biasing member 148 will become elongated thereby creating a tensile biasing force which is stored within the biasing member 148 and which is applied to the adapter 116 at the outer wall 134 to create a torsional biasing moment on the shaft 16.

The torsional moment applied to the hex end 64 by a user will equal the torsional moment applied to the adapter 116 by the biasing member 148 and will equal the torsional biasing moment applied to the shaft 16. However, for any given torsional biasing moment applied to the shaft 16, the magnitude of the tensile force within the biasing member 148, which is needed to generate the given torsional biasing moment, may be adjusted by varying the respective diameters of the outer wall 134 of the adapter 116 and/or of the sidewall 66 of the hub 62. For example, while producing the same torsional biasing moment, the size of the required tensile force within the biasing member 148 will decrease as the diameter of the outer wall 134 is increased. When the desired amount of tension has been produced in the biasing member 148 and when the desired torsional biasing moment has been applied to the shaft 16, the set screws 52 are tightened against the rib 93 of the actuator member 60, thereby fixing the actuator member 60 against rotation and connecting the actuating member 60 to the base 24 and the chute 12. The radial tensioner 10 is capable of creating a clockwise or counterclockwise biasing force relative to the longitudinal axis 20 of the shaft 16 through the appropriate rotation of the actuator member 60.

As the scraper blades 14 wear, the biasing member 148 will begin to contract thereby causing the shaft 16 to further rotate so that the scraper blades 14 will remain in contact with the conveyor belt 18. The shaft 16 will continue to rotate as the blades 14 wear until the biasing member 148 returns to its original non-biased or unstretched position. The biasing member 148, in either its stretched or unstretched condition, will absorb most rotational forces or shocks that are transmitted from the shaft 16 thereby reducing damage to the conveyor belt cleaner mechanism. The bushing 104 will additionally absorb any shocks that are transmitted to the shaft 16 by the scraper blades 14 which are substantially linear and perpendicular in direction relative to the shaft 16 to additionally reduce damage to the conveyor belt cleaner mechanism. As can be seen in FIG. 4, the biasing member 148 may also act to vertically support the adapter 116 and the shaft 16 to thereby relieve the bearing load placed upon the bushing 104 by the shaft 16. While the radial tensioner 10 described herein has been described as utilizing a biasing member 148 in which a tensile force is created to torsionally bias the shaft 16, biasing members 148 in which a compressive or bending force is created within the biasing member are additionally applicable to the present invention.

The tensioner 10 will limit the backlash forces that may arise when the tensioner 10 is being adjusted while the belt 18 is in operation or when the direction of rotation of the belt 18 is reversed. A backlash occurs when the cleaning blades 14 are pulled by the belt 18 in the direction of rotational bias such that the blades 14 are rotated by the belt 18 to the opposite side of the shaft 16. Should a backlash occur, as the blades 14 and shaft 16 rotate in the direction of rotational bias, the biasing member 148 will contract and will unwrap from the adapter 116 thereby limiting the harmful forces which otherwise could be created and applied to the tensioner 10 or the chute 12 during a backlash.

In another embodiment, not shown, the radial tensioner may include a ratchet mechanism consisting of a plurality of teeth (not shown) extending from the rim 42 of the base 24 and a pawl (not shown) pivotally attached to the outer surface 70 of the sidewall 66 of the actuator member 60. The pawl is biased towards the rim 42 of the base 24 to engage the teeth in a ratcheting manner preventing rotation of the actuator member 60 in one rotational direction and allowing the actuator member 60 to be rotated in the opposite direction while apply a biasing force upon the hexagonal end 64 of the actuator member 60. As the biasing force is created or increased in the biasing member 148, the pawl will prevent the biasing force from being lost when the rotational force is removed from the hexagonal end 64. The pawl also allows the biasing force to be adjusted in increments without any loss of previous gains. Once the desired biasing force has been reached, the set screws 52 may then be tightened to additionally secure the actuator member 60 from rotating. The pawl may be biased in different directions to prevent rotation of the actuator member 60 in either the clockwise or counterclockwise direction as desired. Alternatively, the teeth may be located on the actuator member 60 and the pawl on the base 24.

The tensioner 10 is designed to be retrofit on existing conveyor belt cleaning shafts 16. The tensioner 10 may also be used to replace an existing tensioner which has proven to be unsatisfactory or otherwise in need of replacement or the tensioner 10 may be added to existing conveyor belt cleaning shafts which were previously not provided with a tensioner. The tensioner 10 may also be supplied as original equipment with a conveyor belt cleaner mechanism. The tensioner 10 permits quick and easy installation of a tensioner to an existing cleaner shaft 16 without requiring any major modifications to the existing equipment.

Various features of the invention have been particularly shown and described in connection with the illustrated embodiments of the invention, however, it must be understood that these particular arrangements only illustrate and that the invention must be given its fullest interpretation within the terms of the appended claims.

What is claimed is:

1. A tensioning device for imparting torsional bias to a support shaft which is rotatable with respect to a fixed frame including means for imparting torsional bias to the shaft, said biasing means including a first end, a second end and a center section, said center section extending radially between said first end and said second end; means for connecting said first end of said biasing means to the shaft for conjoint rotation therewith; an actuator member selectively connectable to the fixed frame such that said actuator member is relatively repositionable with respect to the fixed frame; means for connecting said second end of said biasing means to said actuator member; and means associated with said actuator member and the fixed frame for connecting said actuator member to the fixed frame after the torsional biasing force is imparted to the shaft, whereby repositioning of said actuator member is effective to impart a torsional bias to the shaft through said biasing means.

2. The tensioning device of claim 1 wherein said means for connecting said first end of said biasing means to the shaft includes an adapter having a first end and a second end, said first end being adapted for connection to the shaft, said second end adapted for connection to said first end of said biasing means.

3. The tensioning device of claim 2 wherein said second end of said adapter defines a slot through which said center section of said biasing means passes.

4. The tensioning device of claim 1 wherein said center section of said biasing means is thinner than said first end or said second end of said biasing means.

5. The tensioning device of claim 1 additionally including a base connected to the fixed frame and connectable to said actuator member to selectively prevent rotation of said actuator member after a torsional bias is imparted to said shaft.

6. The tensioning device of claim 5 including ratchet means connectable between said base and said actuator member to allow for selective incremental rotational movement of said actuator member with respect to said base in one direction only.

7. The tensioning device of claim 1 additionally including a bushing disposed between the shaft and the fixed frame to absorb vibrations from the shaft.

8. The tensioning device of claim 1 wherein said actuator member comprises a hub, said hub including a slot defined through the outer periphery of said hub, said slot being adapted to allow said center section of said biasing means to pass through said slot.

9. The tensioning device of claim 1 including means for rotating said actuator member to thereby impart a torsional bias to said shaft.

10. The tensioning device of claim 1 wherein said biasing means is operative to impart a torsional bias to said shaft when said actuator member is rotated in either direction of rotation.

11. The tensioning device of claim 1 in which said biasing means includes a resilient elastomeric web extending radially between the shaft and said actuator member.

* * * * *